Aug. 4, 1931.                C. C. ARMSTRONG                1,816,994
                       AUTOMATIC COFFEE PERCOLATOR
                        Filed June 6, 1929      2 Sheets-Sheet 1
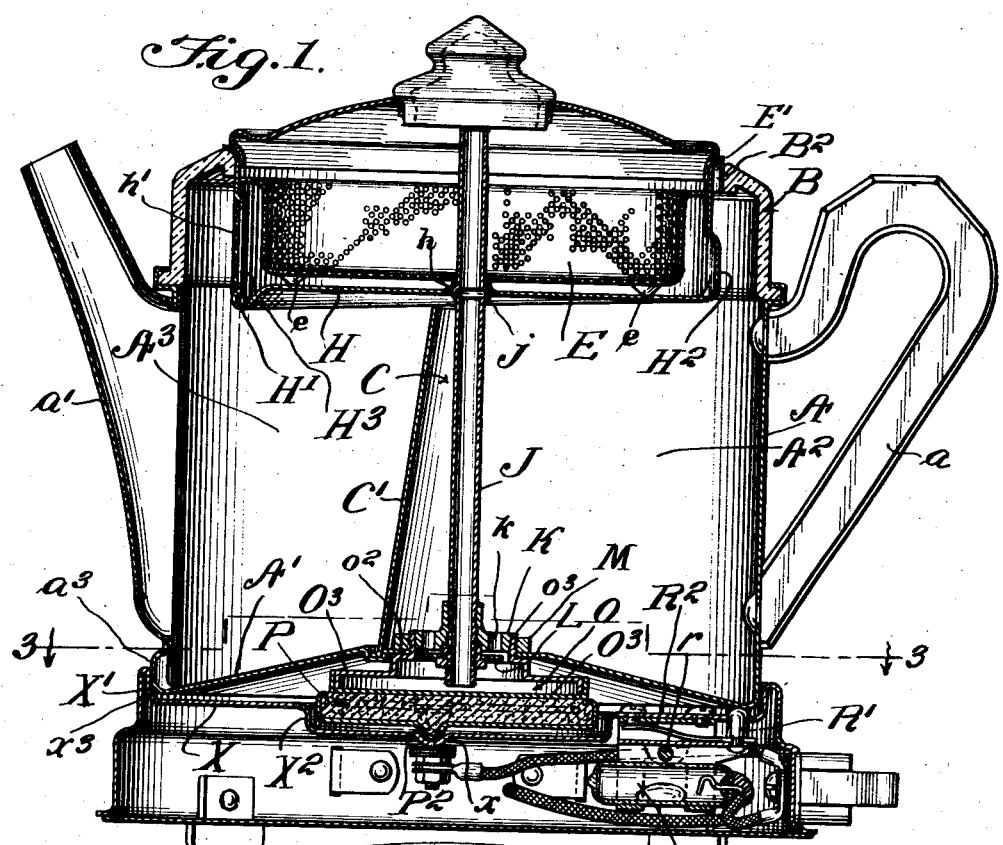
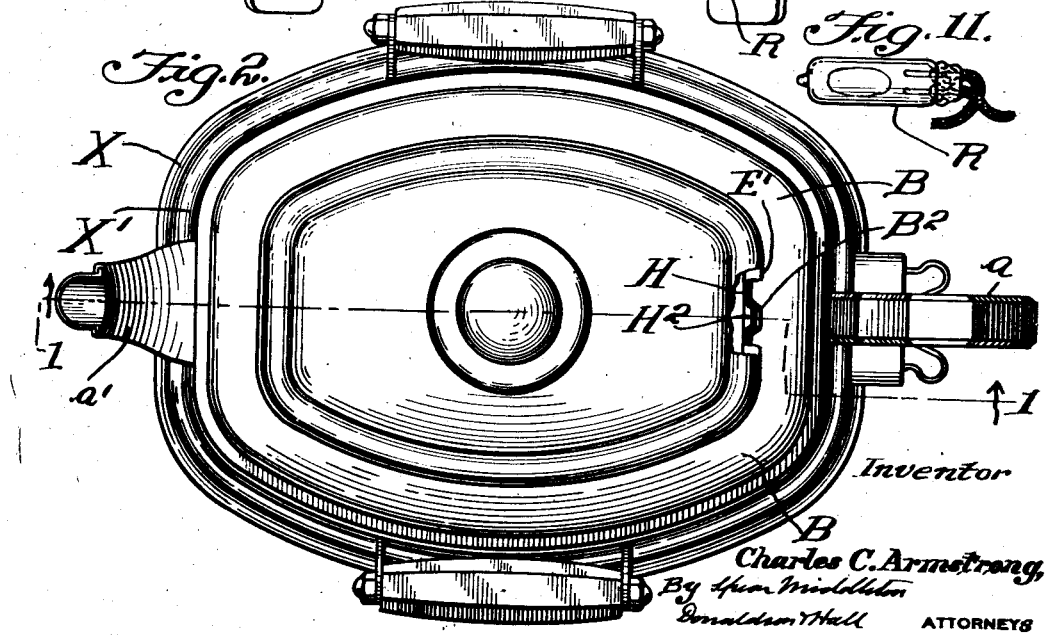
Inventor
Charles C. Armstrong,
By
ATTORNEYS Aug. 4, 1931.  C. C. ARMSTRONG  1,816,994
AUTOMATIC COFFEE PERCOLATOR
Filed June 6, 1929  2 Sheets-Sheet 2
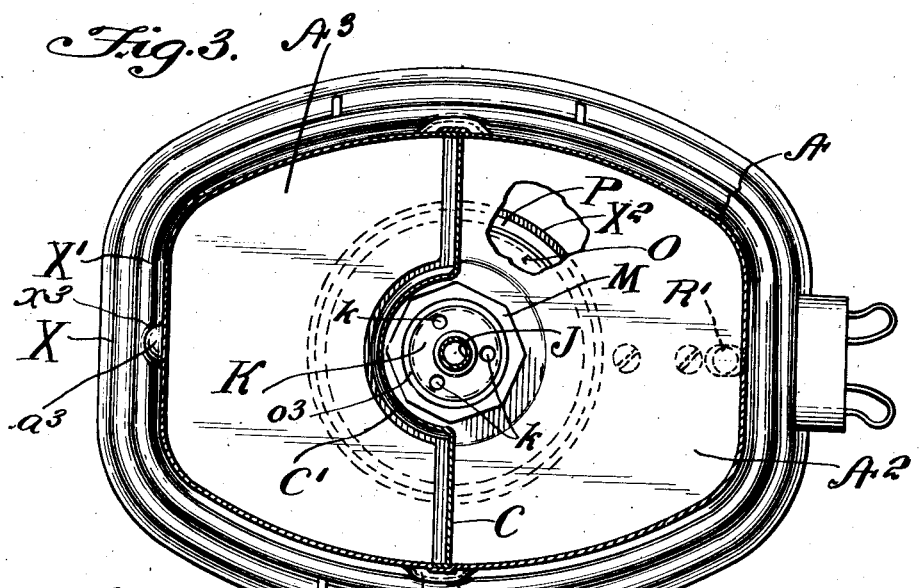
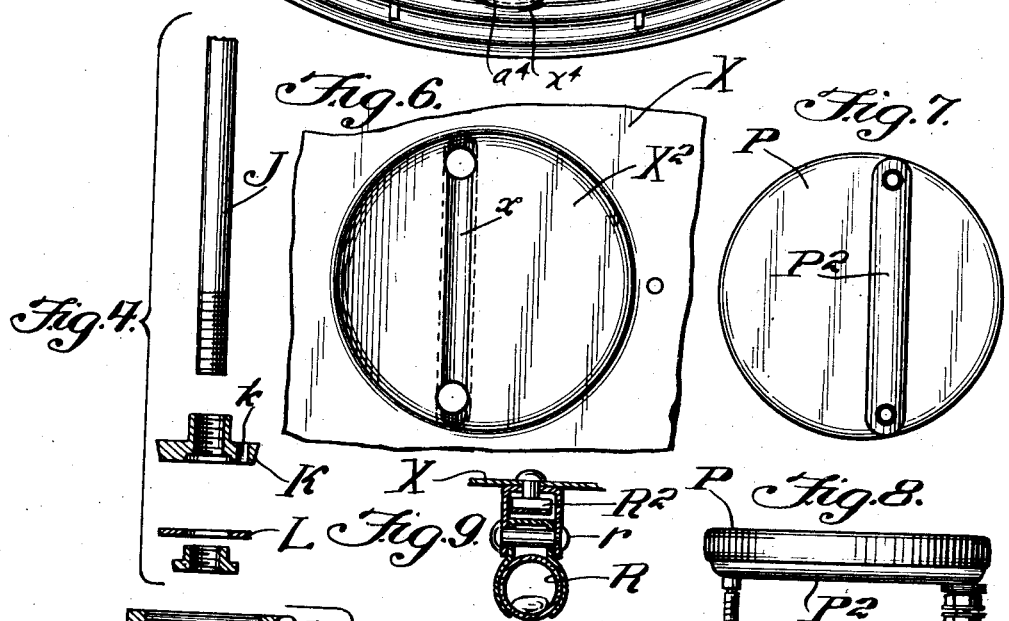
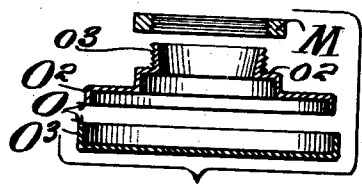
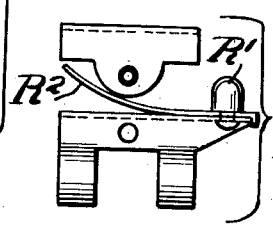
Inventor:
Charles C. Armstrong,
By *Spear Middleton*
*Donaldson Hall*
ATTORNEYS Patented Aug. 4, 1931

1,816,994

UNITED STATES PATENT OFFICE

CHARLES C. ARMSTRONG, OF HUNTINGTON, WEST VIRGINIA, ASSIGNOR, BY MESNE ASSIGNMENTS, TO ARMSTRONG APPLIANCE CORPORATION, A CORPORATION OF DELAWARE

AUTOMATIC COFFEE PERCOLATOR

Application filed June 6, 1929. Serial No. 368,860.

My said invention relates to improvements in coffee percolators of the drip type; i. e., those in which the hot water passes through the coffee but once.

One object of the invention is to produce an electric percolator of this type which will be of an automatic nature, the supply of heat being automatically cut off after the required amount of water has passed through the coffee.

Another object is to accomplish this automatic action by providing a two compartment container with interposed percolator means arranged so that the water will be transferred from one to the other and that the heat will be cut off by the tilting of the container resulting from said transfer of the water.

Still another object is to provide a device of this type in which the percolating action will be started in a minmium amount of time.

A further object is to provide a construction in which all coffee and water containing parts are removable for washing and cleansing without endangering the electrical equipment which is confined entirely to the base.

With these and other objects in view, which will hereinafter appear, the invention includes the novel construction and arrangement and combination of parts hereinafter described, what I consider as my invention being defined by the claims appended hereto.

What I at present consider as the preferred embodiment of the invention is illustrated in the accompanying drawings in which:

Figure 1 is a section on line 1—1 of Fig. 2.

Fig. 2 is a plan view of the coffee pot or percolator partly broken away.

Fig. 3 is a section on line 3—3 of Fig. 1.

Fig. 4 is a detail of the water elevating tube.

Fig. 5 is a detail of the water heating chamber.

Figs. 6 to 10 inclusive are views of further details.

Referring by reference characters to this drawing, A designates the main body or container of the pot which may be of any desired size and shape but is preferably of oval shape in cross section as shown, for reasons which will hereinafter appear, being provided with the customary handle $a$ and spout $a'$ and with a top portion B which may be made of glass or metal. The bottom of the body or container is dished upwardly or made of approximately truncated cone shape as indicated at $A'$.

The interior chamber of the container is divided into two compartments $A^2$ and $A^3$ respectively by a transverse partition C which has a central offset portion of approximately semi-cylindrical shape as indicated at $C'$, the spout $a'$, as will be observed, leading from the compartment $A^3$.

The bottom $A'$ carries a water heating chamber O which comprises a bottom plate $O^3$ made of metal having a high thermal conductivity, such as copper for example, and an upper portion $O^2$ made of metal having a comparatively low thermal conductivity such as a nickel-silver alloy, the parts being secured together to effect a water tight joint in any desired manner, as by providing them with overlapping marginal flanges as shown.

The upper portion $O^2$ is made of stepped formation to provide an annular shoulder $o^2$ and externally threaded nipple $o^3$ which latter passes through a central opening in the bottom $A'$, the edge of the bottom wall around said opening resting upon the shoulder $o^2$ and being clamped thereon by a nut M.

The flange $o^2$ carries a disk member K provided with openings $k$ which place the water compartment $A^2$ in communication with the heating chamber O, and said disk K carries a percolator tube J leading upward from the heating chamber through the water chamber and into the basket E hereinafter described.

A percolator disk valve L is loosely mounted on the tube in underlying relation to the openings $k$, the arrangement being such that water from chamber $A^2$ will pass downward into the heating chamber O and the heated water will be driven upward through the pipe J into the coffee containing basket E in the manner well understood by those skilled in the art.

The basket E, which is of reticulated form, is contained within an outer or supporting basket H of imperforate material (sheet metal) having an outwardly curved upper edge E′ designed to be supported by the upper edge of the top portion B, and having a central opening to receive the pipe J, the edge of which opening may be flared upwardly as at $h$ so as to form a rounded edge to seat on a bead $j$ formed on tube J. Said edge also serves as a support for the central portion of the bottom of basket E which is likewise apertured for the passage of tube J and has projections or feet $e$ on its under surface which, together with flange $h$, serve to keep the bottom of basket E spaced from the bottom of basket H.

Said basket H has in its side wall adjacent the spout and overlying the compartment $A^3$ an opening H′ provided with a screen $h'$ and it will be seen that when basket E is supplied with coffee the water drawn from chamber A and ejected through pipe J will, after percolating through the coffee and into basket H, be delivered through opening H′ into compartment $A^3$. The bottom of basket H is preferably provided with an inclined drainage channel $H^3$ to facilitate the flow of the liquid towards the outlet opening.

Said basket H is also provided with a rib $H^2$ designed to coact with a groove $B^2$ in section B to prevent basket H from being inserted in other than the correct position.

It is desirable to provide means which will ensure the pot being placed on the base in such position that neither the front nor back edges of the pot will have a frictional contact with the flanges of the base which would interfere with the free tilting of the pot. To this end I provide the flange X′ on opposite sides and in line with its shortest diameter with recesses $x^4$ in its inner face which are designed to receive corresponding ribs or projections $a^4$ on the sides of the pot, thereby holding the pot centralized lengthwise of the base and preventing the possibility of such frictional contact at the ends as would preclude the free tipping action.

In order to apply the heat for heating the water and also to provide for the automatic action of the percolator, I arrange the following instrumentalities.

X designates a base of pressed sheet metal having its upper surface provided with a peripheral flange or rib X′ and having a central depressed portion $X^2$ to receive the heating element P which may be of any desired construction and on the upper surface of which the heating plate $O^3$ rests when the pot is in place and by which it is supported.

Said heating element has a transverse boss $P^2$ on its under side Fig 7 which rests in a corresponding groove or channel $x$ Fig. 6 in the base in such a manner that the heating element is free to rock on said boss as a fulcrum and with it the pot supported thereby, said pot being retained against displacement by the annular flange X′ engaging the base of the pot.

Thus when the coffee pot is placed on the base with the compartment $A^2$ filled with water, the right hand side (Fig. 1) will be depressed and after the water or the bulk thereof has been transferred to the compartment $A^3$ as above described, the pot will rock towards the left and its left hand side be depressed.

I utilize the removability of the pot from its base and its tilting action while resting thereon to control the heating current by automatic switch means, the preferred form of which will now be described.

R designates a mercury switch which is pivotally connected to the base to oscillate about an axis $r$ and is provided with a projection R′ projecting through an opening in the top of the base in position to contact with the bottom of the coffee pot near its right hand edge (Fig. 1). A spring $R^2$ tends to rock said mercury switch in such direction as to elevate the pin R′ at which time the globule of mercury will be in such position as to break the circuit.

The placing of the coffee pot in position on the base with the compartment $A^2$ supplied with the desired amount of water will depress the pin R′ and rock the mercury switch into position to cause the globule of mercury to close the circuit. After the water has been transferred to the compartment $A^3$, the pot will be tilted as above described which will permit spring $R^2$ to return the switch to circuit breaking position.

To guard against the coffee pot being placed on the base in reversed position, I provide the bottom on one side, as for instance adjacent the spout, with a projection $a^3$ to cooperate with the recess $x^3$ in the base, this projection preventing seating of the pot on the base if the pot should be reversed in position.

It will be understood that the spring R² will be made strong enough so that if the empty coffee pot is placed on the base, its weight will be insufficient to operate the switch.

The pot will, of course, be provided with the usual cover as shown. By having the pot and base of oval shape in cross section, proper alinement of the parts is ensured without detracting from the ornamental appearance.

While it is possible to place the pot on the base in reversed position, this, due to the projection $a^3$, will result in no harm and the operator would readily discover the mistake.

The provision of the water chamber beneath the bottom of the pot segregates a small quantity of the water and brings it in intimate contact with the surface exposed to the heating means while at the same time, the forming of the upper wall of the chamber of material of low heat conductivity avoids conduction of heat to the water outside the chamber which avoidance is increased by the provision of the air space formed by spacing the major portion of the top of the water chamber from the bottom of the pot.

This enables the rapid starting of the percolator or drip coffee action due to the extremely rapid heating of the small amount of segregated water in the heating chamber and the reduction in heat conducted to parts when heating is not desired.

Having thus described my invention, what I claim is:

1. A coffee percolator comprising a base, an electric heating element pivotally supported thereby substantially central thereof, a coffee pot supported on said heating element and comprising compartments on opposite sides of an approximately vertical plane passing through said pivotal axis, and percolator means operating under the action of the heating element to transfer water from one compartment to the other and thereby rock said base, and means whereby the rocking of said base cuts off current from said heating element.

2. A coffee percolator comprising a base, an electric heating element carried thereby means to support said element on said base and to enable it to oscillate about a horizontal axis substantially centrally thereof, a coffee pot carried thereby comprising two liquid compartments and a separating partition located in a plane passing through said axis and percolator means for transferring liquid from one compartment to the other, switch means for controlling current to the heating element, said switch means including a movable part projecting through an opening in the base for contact with the bottom of the pot on one side of said pivotal axis.

3. A coffee percolator comprising a base, an electric heating element having a pivotal connection therewith, said pivotal connection having its axis disposed in a horizontal plane substantially centrally of the base, a coffee pot having a substantially centrally disposed transverse vertical partition forming water and coffee compartments, a heating chamber on the bottom of the pot adapted to be supported on said heating element, said heating chamber being in communication with said water compartment, a coffee basket in the upper part of said pot, a pipe for conveying water from the heating chamber to said basket, means for causing the liquid passing from the basket to be delivered into the coffee compartment, and means whereby the rocking of the base under the weight of the accumulated liquid in the coffee compartment automatically cuts off the supply of current to the heating element.

4. A coffee percolator according to claim 3 in which the means for delivering the coffee impregnated water to the coffee compartment comprises an outer imperforate basket having a delivery opening leading to the coffee compartment, and a horizontal bottom with inclined drainage channels therein leading to said opening.

5. A coffee percolator comprising a base, an electric heating element carried thereby, a pot supported on said base and comprising water and coffee receiving compartments and a coffee basket, percolator means operating under the action of said heating element to transfer water from said water compartment through the basket to the coffee compartment, and means for automatically cutting off the current to the heating element controlled by the water thus transferred.

6. A coffee percolator comprising a base, an electric heating element carried thereby, a pot removably supported on the base and comprising water and coffee compartments and percolator means operating under the action of said heating element to transfer water from the water compartment to the coffee compartment, and means whereby the placing of the pot containing water on the base automatically turns on current to the heater and the transfer of said water automatically cuts off the current.

7. A coffee percolator comprising an oval base having a marginal flange, an electric heating element carried thereby mounted to oscillate on a transverse axis, a coffee pot of oval shape in cross section adapted to be supported on said heating element and to fit within said marginal flange, said coffee pot comprising water and coffee compartments and percolator means adapted to transfer water from the water compartment to the coffee compartment under the action of said heating element, and switch means for controlling the passage of current to said heating element, said switch means including a depressible element beneath the bottom of the water compartment, the coffee pot having a projection on its lower edge and said marginal flange a recess to receive said projection.

8. A coffee percolator comprising a base, a heating plate carried thereby, a removable pot having a basket in its upper part and a central opening in its bottom, a water chamber beneath the pot bottom having a bottom to overlie said heating element and having on its top a shoulder to engage the pot bottom and an upstanding flange to engage the opening therein, means engaging said flange to clamp the bottom against said shoulder, a disk member held within said flange and having a central and side openings, a water elevating tube carried by the central opening, and check valve means cooperating with said side openings.

9. A coffee percolator comprising a pot having a basket, said pot having a central opening in its bottom, a heating chamber having its top wall provided with an upstanding flange secured within said opening, a ported disk member carried within said flange, and having an axial opening therethrough, a water elevating pipe held in said opening and extending into said basket, said pipe depending below the disk member, and a check valve located on said depending portion and cooperating with the ports in the disk member.

10. A coffee percolator comprising a substantially oval base having an upstanding marginal flange, an electric heating element carried thereby and mounted to oscillate about a transverse axis, a coffee pot of substantially oval shape in cross section adapted to be supported on said heating element and to fit within said marginal flange, said coffee pot comprising water and coffee compartments and percolator means arranged to transfer water from the water compartment to the coffee compartment, under the action of said heating element and thereby tip the pot, switch means for controlling the passage of current to said heating element actuated by the tipping of the pot, and means for centering the pot lengthwise of the base to prevent frictional contact between the pot and flange at the ends.

11. A coffee percolator comprising a substantially oval base having an upstanding marginal flange, an electric heating element carried thereby and mounted to oscillate about a transverse axis, a coffee pot of substantially oval shape in cross section adapted to be supported on said heating element and to fit within said marginal flange, said coffee pot comprising water and coffee compartments and percolator means arranged to transfer water from the water compartment to the coffee compartment under the action of said heating element and thereby tip the pot, switch means for controlling the passage of current to said heating element actuated by the tipping of the pot, said flange having inwardly facing opposed recesses on opposite sides of the base and said pot having projections engaging said recesses.

12. A coffee percolator comprising a pot having a substantially vertical partition forming water and coffee compartments open at their upper ends, said partition terminating below the top of the pot, a water elevating pipe extending above said partition and having an annular bead, an imperforate basket overlying said compartments and having an opening to receive said pipe and a seat encircling said opening to coact with said bead, said imperforate basket having a discharge overlying the coffee compartment, said seat having an upwardly extending thimble, and a reticulated basket having an opening to receive the pipe, the edge of the opening resting on said thimble.

13. A coffee percolator comprising a pot having a substantially vertical partition forming water and coffee compartments open at their upper ends, said partition terminating below the top of the pot, a water elevating pipe extending above said partition and having an annular bead, an imperforate basket having a substantially flat bottom overlying said compartments and through which said tube projects, said imperforate basket having a delivery opening leading to the coffee compartment and having inclined channels in its bottom leading to said delivery opening, and a reticulated basket within said imperforate basket and through the bottom of which said pipe also extends.

14. A coffee percolator comprising a base including an electric heating element mounted to have limited pivotal movement about a horizontal axis, a coffee percolating pot removably supported on the heating element and comprising water and coffee compartments and means whereby heat applied to said pot transfers water from the water compartment to the coffee compartment, and means whereby the placing of the coffee pot on the heating element automatically closes the circuit to said heating element and the transfer of water to the coffee compartment automatically opens said circuit.

15. A coffee percolator comprising a base having a transverse groove in its upper face, a heating element having a transverse rib on its under side to pivotally engage said groove, a coffee pot having a water chamber beneath its bottom to rest on said heating element, said coffee pot comprising water and coffee compartments arranged on opposite sides of a vertical plane passing through said rib and groove, said water compartment communicating with said water chamber, a pipe for elevating water from said water chamber, a coffee basket and deflector means for receiving water from said pipe and transferring it to the coffee compartment, and switch means actuated by the rocking of the heating element to control the current to said heating element.

In testimony whereof, I affix my signature.

CHARLES C. ARMSTRONG.